(12) United States Patent
Jung

(10) Patent No.: US 6,195,221 B1
(45) Date of Patent: Feb. 27, 2001

(54) PRELIMINARY SEARCH METHOD FOR MINIMIZING DROP DOWN PHENOMENON OF HARD DISK DRIVE

(75) Inventor: Sung-Woon Jung, Kyongsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/089,455

(22) Filed: Jun. 3, 1998

(30) Foreign Application Priority Data

Jun. 3, 1997 (KR) .................................................. 97-22833

(51) Int. Cl.$^7$ .................................................. G11B 5/596
(52) U.S. Cl. ........................................ 360/78.06; 360/128
(58) Field of Search .................... 360/75, 78.01, 360/78.04, 78.06, 128; 369/71

(56) References Cited

U.S. PATENT DOCUMENTS

| | | | |
|---|---|---|---|
| 4,477,755 | 10/1984 | Rickett | 318/611 |
| 4,594,617 | * 6/1986 | Tezuka | 360/128 X |
| 4,638,230 | 1/1987 | Lee | 318/632 |
| 5,119,250 | * 6/1992 | Green et al. | 360/78.06 |
| 5,233,486 | 8/1993 | Albert | 360/77.04 |
| 5,262,907 | 11/1993 | Duffy et al. | 360/77.05 |
| 5,305,157 | 4/1994 | Wada et al. | 360/53 |
| 5,307,489 | * 4/1994 | Yamazaki | 360/75 X |
| 5,424,884 | * 6/1995 | Nonaka | 360/128 |
| 5,541,785 | 7/1996 | Sasamoto et al. | 360/77.05 |
| 5,583,876 | 12/1996 | Kakuta | 371/40.4 |
| 5,612,830 | * 3/1997 | Gregory et al. | 360/128 |
| 5,650,882 | 7/1997 | Tsurumi et al. | 360/51 |
| 5,661,615 | 8/1997 | Waugh et al. | 360/75 |
| 5,680,612 | 10/1997 | Asada et al. | 395/613 |
| 5,719,722 | 2/1998 | Shimoda | 360/78.14 |
| 5,748,590 | 5/1998 | Iwasaki | 395/58 |
| 5,850,321 | * 12/1998 | McNeil et al. | 360/106 |

* cited by examiner

Primary Examiner—Andrew L. Sniezek
(74) Attorney, Agent, or Firm—Robert E. Bushnell, Esq.

(57) ABSTRACT

A method for performing a preliminary search for cylinders in a hard disk drive. The method includes the steps of setting a target cylinder upon receiving a sequential data write command from the external device; setting search cylinders and setting a counter value to have a same value as a number of the search cylinders; sequentially searching the search cylinders for the target cylinder until the counter value becomes zero; and writing data on the target cylinder if the counter value is zero. Here, the search cylinders are positioned between the target cylinder and a current cylinder. The current cylinder is the cylinder where a disk head is located currently.

26 Claims, 2 Drawing Sheets

PRELIMINARY SEARCH METHOD FOR MINIMIZING DROP DOWN PHENOMENON OF HARD DISK DRIVE

CLAIM OF PRIORITY

This application makes reference to, incorporates the same herein, and claims all benefits accruing under 35 U.S.C. § 119 from an application entitled Preliminary Search Method For Minimizing Drop Down Phenomenon Of Hard Disk Drive earlier filed in the Korean Industrial Property Office on Jun. 3, 1997, and there duly assigned Ser. No. 22833/1997, a copy of which is annexed hereto.

BACKGROUND OF THE INVENTION

1. Technical Field

The present invention relates to a track search method of a hard disk drive, and more particularly to a preliminary track search method minimizing data loss of a hard disk drive.

2. Related Art

Computer systems are information handling systems that are utilized by many individuals and businesses today. A conventional computer system can be defined as a microcomputer that includes a central processing unit (CPU), a volatile memory, a non-volatile memory, a display monitor, a keyboard, a mouse, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

The hard disk storage device can also be referred to as a hard disk drive containing a hard disk, wherein the hard disk is the actual storage medium. A platter is another tern for a hard disk. The hard disk drive is an auxiliary memory unit of the computer system. The hard disk drive contains components enabling data to be received from the associated computer system and then written to the hard disk, and also enabling data to be read from the hard disk and then transmitted to the associated computer system. The hard disk drive includes a magnetic read/write head which flies above the surface of the hard disk while the hard disk is rotating.

The hard disk has a plurality of concentric tracks fi)r storing data. Each track has a plurality of sectors. Some hard disk drives contain several hard disks, each hard disk being horizontally mounted on one shared vertical spindle-axis, so that the hard disks from a stack of hard disks. When a disk drive has a plurality of hard disks, with each disk having its own read/write head, every read/write head is aligned on a separate track of its associated hard disk. A head actuator locks all the heads together so that all heads are at the same position from the center of the disk along a given radius. The vertical stack of tracks formed by such an arrangement is referred to as a cylinder. The number of cylinders in a hard disk drive is the same as the number of tracks on a hard disk of that hard disk drive.

A primary function of the hard disk drive is to receive data from the associated computer system, write the data onto the hard disk without loss of the data, and then read and transmit the data to the computer system when necessary. Therefore, a manufacturer of the hard disk drive not only makes an effort to maximize data recording capacity, but also looks for various means to prevent data loss when writing and reading the data.

In a hard disk drive which uses a thin film head, the data recording capacity is about 1.6 gigabytes and more extended capacity cannot be allowed. To solve this problem, manufacturers of hard disk drives lower a flying height of the read/write head gradually, together with an increased data recording density. But, in the case where the flying height is lowered, data could be lost or the hard disk's surface could be damaged due to an unexpected problem involving the head and the disk. For example, if microscopic particles exist on the hard disk's surface or if a distortion occurs in a lubricant layer on the hard disk's surface, the flying height of the read/write head will be raised by the above factors temporarily when writing, sequential data. Thus, data will be lost because the correct data cannot be written onto the hard disk's surface, due to the fact that the strength of the magnetic field arriving at the hard disk's surface is attenuated. Such a phenomenon, occurring when the strength of the magnetic field arriving at the hard disk's surface is attenuated, is called a "drop down phenomenon." Thus, data may be lost in the conventional hard disk drive due to the aforementioned drop down phenomenon. In other words, the drop down phenomenon is a phenomenon which occurs when data is not properly written onto a surface of a hard disk due to the fact that the magnetic field from the read/write head is too weak. The magnetic field might be too weak because the read/write head is too far from the surface of the hard disk. The read/write head might be too far from the surface of the hard disk because a contaminant such as a microscopic particle is located on the surface of the hard disk.

Examples of methods and devices pertaining to magnetic read/write heads of hard disk drives are disclosed in U.S. Pat. No. 5,719,722 for Head Tracking System for a Magnetic Disk Drive, and Having an Actuator for Positioning the Read/Write Head to the Target Track Based on Total Error Signal issued to Shimoda; U.S. Pat. No. 5,541,785 for Magnetic Disk Apparatus With Improved Positioning Control of Magnetic Head issued to Sasamoto et al.; U.S. Pat. No. 5,305,157 for Read Circuit Providing Two Different Reference Levels For Reading The Servo Sectors And Data Sectors of a Rotating Data Storage Disk issued to Wada et al.; U.S. Pat. No. 5,233,486 for Method for Correcting Track Counting Errors During Seeks in a Hard Disk Drive issued to Albert; U.S. Pat. No. 5,262,907 for Hard Disc Drive with Improved Servo System issued to Duffy et al.; U.S. Pat. No. 5,650,882 for Disk Unit Performing Control Using Sector Pulses issued to Tsurumi et al.; and U.S. Pat. No. 4,638,230 for Bang-bang Controlled Velocity Command Generator issued to Lee.

Examples of methods and devices for the detection of defects in hard disk drives are disclosed in U.S. Pat. No. 5,661,615 for Detection of Mechanical Defects in a Disc Drive Using Resonant Frequencies issued to Waugh et al. and U.S. Pat. No. 5,748,590 for Apparatus for Inspecting Disc Recording Medium issued to Iwasaki et al.

Additional examples of methods and devices related to disk drives are disclosed in U.S. Pat. No. 4,477,755 for Method of Suppressing Seek-excited Vibration in a Disk Drive or Similar Servo System issued to Rickert and U.S. Pat. No. 5,583,876 for Disk Array Device and Method of Updating Error Correction Codes by Collectively Writing New Error Correction Code at Sequentially Accessible Locations issued to Kakuta. Examples of document retrieval devices in which a search is performed to locate a designated character string are disclosed in U.S. Pat. No. 5,680,612 for Document Retrieval Apparatus Retrieving Document Data Using Calculated Record Identifier issued to Asada et al.

Although presently there are devices and methods pertaining to the improvement of hard disk drives, I have found that there is a need for an enhanced method which minimizes the drop down phenomenon.

SUMMARY OF THE INVENTION

Accordingly, it is an object of the present invention to provide a preliminary search method minimizing a poor quality rate in a test process during a manufacturing process by reducing the drop down phenomenon.

It is another object of the present invention to provide a method for cleaning contaminants from a disk drive storage unit.

To achieve the above objects and other objects, there is provided a method for preliminarily searching cylinders in a hard disk drive. The method includes the steps of setting a target cylinder upon receiving a sequential data write command from the external device; setting search cylinders and setting a count value to have a same value as a number of the search cylinders; sequentially searching among the search cylinders for the target cylinder until the count value becomes zero; and writing data on the target cylinder if the count value is zero. Here, the search cylinders are positioned between the target cylinder and a current cylinder where the head is located currently.

To achieve the above objects and other objects, there is provided a method of cleaning components of a magnetic disk storage unit and writing data to the magnetic disk storage unit, comprising the steps of: receiving a data signal from a control unit to a disk drive; setting a final location on a magnetic surface of a platter in said disk drive according to said data signal, said platter rotating around an axis in said disk drive; setting a plurality of intermediate locations on said magnetic surface; setting a counter value corresponding to said plurality of intermediate locations, transporting a head unit of said disk drive to a plurality of positions seriatim, said plurality of positions corresponding to said plurality of intermediate locations and said final location, said transporting step including acceleration and deceleration of said head unit thereby causing contaminants to be removed from said head unit; modifying said counter value on each occasion said head unit is transported to a next one of said plurality of positions; and according to said counter value, recording data corresponding to said data signal at said final location with said head unit.

Additionally, to achieve the above objects and other objects, there is provided a method of cleaning components of a magnetic disk storage unit and writing data to the magnetic disk storage unit, comprising the steps of: receiving a data signal from a control unit to a disk drive; setting a final location on a magnetic surface of a platter in said disk drive according to said data signal, said platter rotating around an axis in said disk drive; setting a plurality of intermediate locations on said magnetic surface; transporting a head unit of said disk drive to a plurality of positions seriatim, said plurality of positions corresponding to said plurality of intermediate locations and said final location, said transporting step including acceleration and deceleration of said head unit thereby causing contaminants to be removed from said head unit; and recording data corresponding to said data signal at said final location with said head unit.

Also, to achieve the above objects and other objects, there is provided a method of cleaning components of a magnetic disk storage unit and writing data to the magnetic disk storage unit, comprising the steps of: receiving a data signal from a control unit to a disk drive; setting a final location on a magnetic surface of a platter in said disk drive according to said data signal, said platter rotating around an axis in said disk drive; setting a plurality of intermediate locations on said magnetic surface; transporting a head unit of said disk drive to a plurality of positions seriatim, said plurality of positions corresponding to said plurality of intermediate locations and said final location, said transporting step including an acceleration motion, a uniform motion, and a deceleration motion of said head unit, thereby collecting contaminants from said magnetic surface with said head unit and then removing the contaminants from said head unit; and recording data corresponding to said data signal at said final location with said head unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail below with reference to the accompanying drawings.

Figure 1:
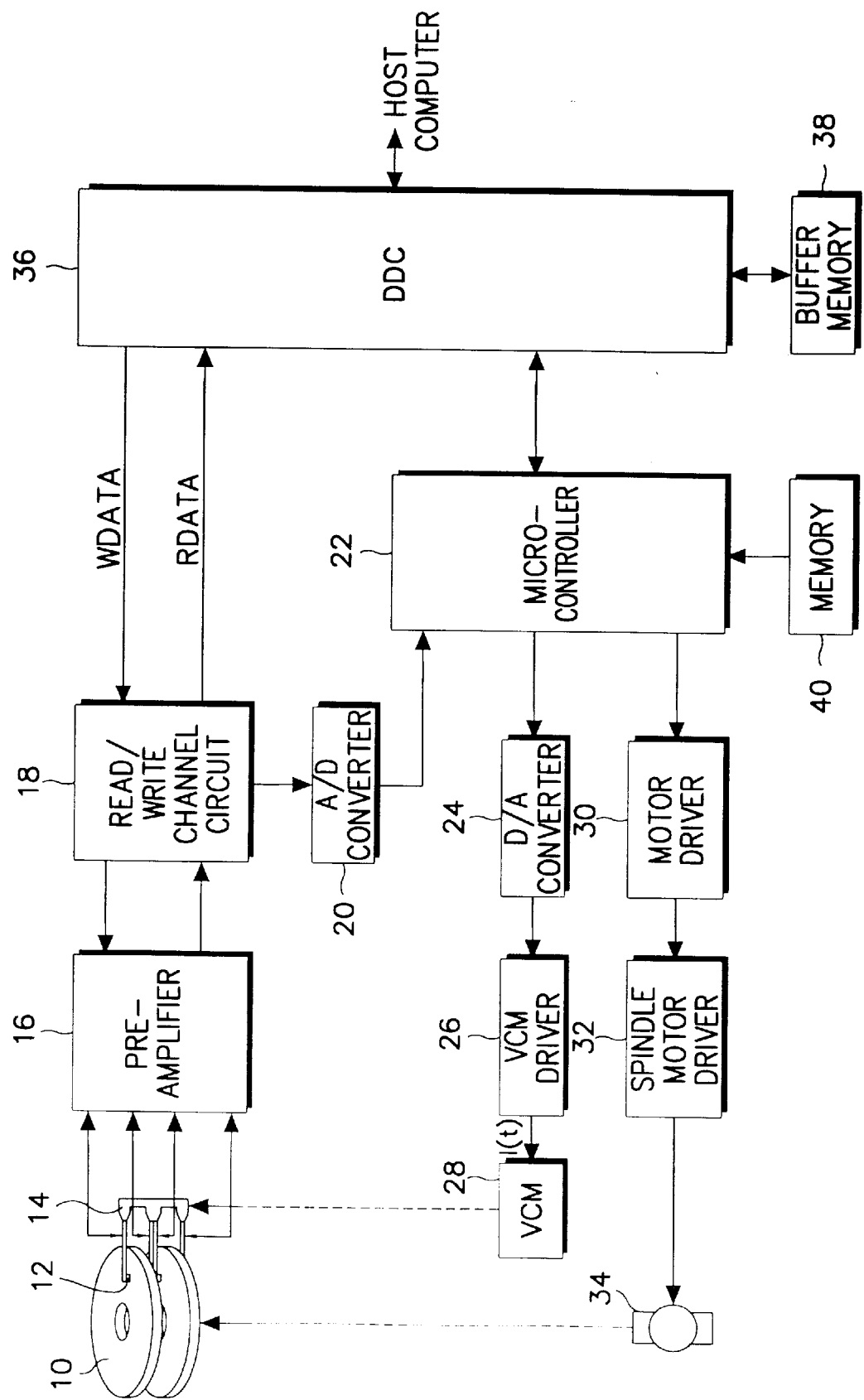
FIG. 1 illustrates a block diagram of a hard disk drive.

Turning now to the drawings and more particularly to FIG. 1, which illustrates a block diagram of a hard disk drive, a general hard disk drive has two hard disks 10 and their corresponding four heads 12. As illustrated in FIG. 1, the hard disks 10 rotate in the state of being installed in a driving shaft of a spindle motor 34 as a stack type and each disk surface corresponds to one of the heads 12. The disk 10 consists of several tracks arrayed in a concentric circle. It contains a maintenance area where a parking zone at which the head 12 is located when the drive is not in use (in a power-off state), substitution data for a bad sector and various data for system maintenance are written. Each of the heads 12 is located on the disk surface and installed in an arm 14 that extends perpendicularly to an arm assembly of a rotary voice coil motor (VCM) 28.

A pre-amplifier 16 pre-amplifies the read signal picked up by one of the heads 12 in a data read mode, and applies it to a read/write channel circuit 18. The pre-amplifier 16 writes encoded write data on the surface of the disk 10 by driving the corresponding one of the heads 12, in a data write mode. The pre-amplifier 16 selects one of the heads 12 under the control of a disk data controller (DDC) 36. The read/write channel circuit 18 decodes a read signal applied from the pre-amplifier 16 to generate read data RDATA, and encodes write data WDATA received from the disk data controller 36 to apply it to the pre-amplifier 16. Further, the read/write channel circuit 18 generates a position error signal (PES) by demodulating head position data written on the disk 10 which is a part of servo data. The position error signal generated from the read/write channel circuit 18 is applied to an analog-to-digital (A/D) converter 20, then the analog-to-digital converter 20 provides a microcontroller 22 with the position error signal by converting it into digital data which corresponds to its level. In cooperation with the read/write channel circuit 18 and pre-amplifier 16, the disk data controller 36 writes data received from a host computer on the disk 10 or transmits data read from the disk 10 to the host computer. Moreover, the disk data controller 36 interfaces a communication between the host computer and the microcontroller 22.

The microcontroller 22 controls the disk data controller 36 in response to a data read/write command received from the host computer and also controls track search and track following. That is, the microcontroller 22 controls track following by using position error signal value input from the analog-to-digital converter 20 and performs servo control for various signals relevant to servo control output from a gate allay (not shown).

A digital-to-analog (D/A) converter 24 converts a control value for controlling position of the head 12 firm the microcontroller 22 into an analog signal. A voice coil motor driver 26 generates a current I(t) to drive an actuator according to the signal output from the digital-to-analog converter 24, then applies it to the voice coil motor 28. The voice coil motor 28, located on one side of the actuator in which the heads are mounted on the other side, moves the heads 12 horizontally on disk 10 in respond to the direction and level of the current input from voice coil motor driving part 26. A motor controller 30 controls a spindle motor driver 32 according to a control value for controlling the rotation of the disks 10 generated from the microcontroller 22.

A buffer memory 38 connected with the disk data controller 36 temporarily stores the data transferred between the hard disk drive and the host computer. A memory 40 connected with the microcontroller 22 consists of a read only memory (ROM) in which control program is stored for searching track according to the present invention, and a random access memory (RAM) for storing various data which are generated during controlling the hard disk drive.

Figure 2:
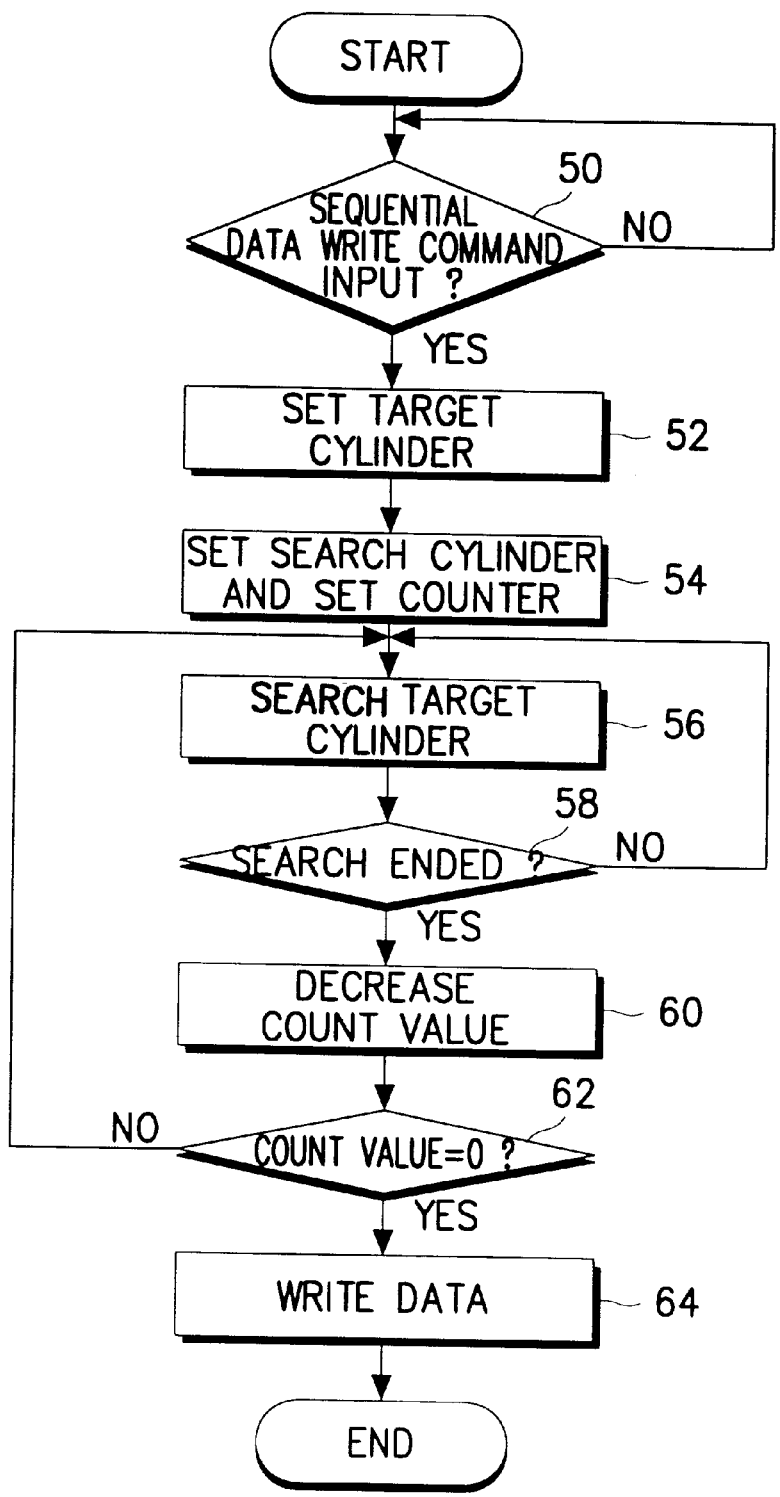
FIG. 2 illustrates a control flowchart of a preliminary search process, according to the principles of the present invention.

Turn now to FIG. 2, which illustrates a control flowchart of a preliminary search process, according to the principles of the present invention. FIG. 2 illustrates a control flowchart of the microcontroller 22 for explaining the preliminary search process according to the preferred embodiment of the present invention. Referring to FIGS. 1 and 2, a track search process according to the present invention will now be described in detail.

The preliminary search process according to the invention can be performed in a physical mode and a logical mode, respectively. The physical mode is a mode including the logical mode, used to test the hard disk drive during a manufacturing process. The logical mode is a mode in which a user reads/writes data onto the hard disk. In the description below, the preliminary search process will be explained in terms of the physical mode.

First, at step 50, the microcontroller 22 determines whether a sequential data write command has been received from the host computer. At step 52, if the sequential data write command has been received, a target cylinder is set according to the sequential data write command. Step 50 is repeated if the sequential data write command has not been received. After step 52 is performed, step 54 is performed. At step 54, the microcontroller 22 sets search cylinders and sets a counter. The search cylinders comprise a specified group of cylinders. The hard disk has a plurality of search cylinders positioned between the target cylinder and a current cylinder. The current cylinder is the cylinder where the read/write head is located currently. The number of search cylinders can be varied. The counter is set to have the same value as the number of the search cylinders. The value of the counter is decreased by one when the read/write head shifts to the next cylinder.

At step 56, the microcontroller 22 sequentially moves the read/write head radially from one search cylinder to the next search cylinder, in search of the target cylinder. At step 58, the microcontroller 22 determines whether the search has been concluded. In other words, at step 58 the microcontroller 22 determines whether a search cylinder has been reached. At step 60, if a search cylinder has been reached, the microcontroller 22 decreases the counter value by one. At step 62, a determination is made to identify whether the current counter value is zero. If the current counter value is not zero, then step 56 is performed again, in order to shift the read/write head radially to the next search cylinder. However, if the current counter value is zero, then step 64 is performed. At step 64, the microcontroller 22 writes the data to the target cylinder, and then completes the preliminary search process according to the present invention.

As can be appreciated from the foregoing, the hard disk drive according to the present invention preliminarily sequentially searches and moves the head across the search cylinders prior to positioning the head on the target cylinder. Therefore, it is possible to remove debris which became attached to the head 12 during the manufacturing process, and it is possible to remove particles which became attached to on the disk 10 during the manufacturing process. Furthermore, in the logical mode, the hard disk drive is automatically switched to the physical mode thereby performing, the same preliminary search process, although a logical command is received from the disk data controller 36 via the microcontroller 22.

In other words, upon receiving a sequential data write command from the external device in the physical and logical mode, the track search operation is executed several times before finally positioning the read/write head at the target cylinder. By this track search operation, any particles on the hard disk are removed. In addition, by this track search operation, any debris that may be attached to the read/write head falls apart and detaches itself from the read/write head. Consequently, the drop down phenomenon is reduced to the minimum. During the track search operation, the read/write head experiences accelerated motion, uniform motion, and decelerated motion. As a result of the accelerated motion, uniform motion, and decelerated motion, particles and debris are removed by the force of the head shaking effect. In other words, particles and debris are removed due to a shaking or vibrating action experienced by the read/write head. In addition, particles and debris are removed due to air flowing across the read/write head. Note that particles It on the disk can be picked up by the head, and then, due to the acceleration, uniform motion, and deceleration, the particles are removed from the head. After this, those particles do not land again on the disk surface, due to an air filter which traps particles, adhesive surfaces on which the particles permanently adhere, control of air pressure, and other methods. A relatively low air pressure in an area of the disk drive will cause particles and air carrying those particles to travel to that area of the disk drive. Some disk drives can contain a gas other than air. The present invention is equally applicable to disk drives having multiple platters and to disk drives having only one platter.

As mentioned above, the present invention can improve the yield by minimizing production of inferior products due to the drop down phenomenon during the manufacturing process of the hard disk drive, and can prevent data loss due to the drop down phenomenon in a user mode.

The preceding paragraphs describe the details of a track search method of a hard disk drive, and more particularly, the details of a preliminary search method minimizing a drop down phenomenon during a sequential data write operation.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of cleaning components of a magnetic disk storage unit and writing data to the magnetic disk storage unit, comprising the steps of:
   receiving a data signal from a control unit to a disk drive;
   setting a final location on a magnetic surface of a platter in said disk drive according to said data signal, said platter rotating around an axis in said disk drive;
   setting a plurality of intermediate locations on said magnetic surface;
   setting a counter value corresponding to said plurality of intermediate locations;
   transporting a head unit of said disk drive to said plurality of intermediate locations and said final location seriatim, said transporting including a plurality of accelerations and decelerations of said head unit removing contaminants from said head unit;
   modifying said counter value on each occasion said head unit is transported to a next one of said plurality of locations; and
   according to said counter value, recording data corresponding to said data signal at said final location with said head unit.

2. The method of claim 1, wherein said final location corresponds to a final track.

3. The method of claim 2, wherein said plurality of intermediate locations corresponds to a plurality of intermediate tracks not including said final track.

4. The method of claim 1, wherein said control unit corresponds to a host computer.

5. The method of claim 1, wherein said platter in said disk drive corresponds to one platter among a plurality of platters in said disk drive.

6. The method of claim 1, further comprising a current location on said magnetic surface, wherein said head unit is positioned adjacent to said current location when said disk drive receives said data signal.

7. The method of claim 6, wherein said plurality of intermediate locations is disposed between said current location and said final location.

8. The method of claim 7, wherein said current location, said plurality of intermediate locations, and said final location correspond to a current track, a plurality of intermediate tracks, and a final track, respectively.

9. The method of claim 1, said transporting step further comprising an acceleration motion, a uniform motion, and a deceleration motion of said head unit, shaking said head unit, said shaking removing contaminants from said head unit.

10. The method of claim 1, said transporting step further comprising an acceleration motion, a uniform motion, and a deceleration motion of said head unit, whereby gas traveling across said head unit removes contaminants from said head unit.

11. The method of claim 1, said transporting step further comprising an acceleration motion, a uniform motion, and a deceleration motion of said head unit, picking up contaminants from said magnetic surface by said head unit and then removing the contaminants from said head unit.

12. The method of claim 11, wherein the contaminants removed from said head unit do not return to said magnetic surface due to a contaminant disposal unit selected from the group consisting of an adhesive panel, a filter, and a low pressure device.

13. The method of claim 11, said acceleration motion, uniform motion, and deceleration motion including a shaking of said head unit, said shaking removing contaminants from said head unit.

14. The method of claim 11, whereby gas traveling across said head unit removes contaminants from said head unit.

15. A method of cleaning components of a magnetic disk storage unit and reading data from the magnetic disk storage unit, comprising the steps of:
   receiving a control signal from a control unit to a disk drive;
   setting a final location on a magnetic surface of a platter in said disk drive according to said control signal, said platter rotating around an axis in said disk drive;
   setting a plurality of intermediate locations on said magnetic surface;
   transporting a head unit of said disk drive to a plurality of positions seriatim, said plurality of positions corresponding to said plurality of intermediate locations and said final location, said transporting step including a plurality of accelerations and decelerations of said head unit, removing contaminants from said head unit; and
   reading data from said final location with said head unit.

16. The method of claim 15, wherein said platter in said disk drive corresponds to one platter among a plurality of platters in said disk drive.

17. The method of claim 15, further comprising a current location on said magnetic surface, wherein said head unit is positioned adjacent to said current location when said disk drive receives said data signal.

18. The method of claim 17, wherein said plurality of intermediate locations is disposed between said current location and said final location.

19. The method of claim 15, said transporting step further comprising an acceleration motion, a uniform motion, and a deceleration motion of said head unit, shaking said head unit, said shaking removing contaminants from said head unit.

20. The method of claim 15, said transporting step further comprising an acceleration motion, a uniform motion, and a deceleration motion of said head unit, whereby gas traveling across said head unit removes contaminants from said head unit.

21. A method of cleaning components of a magnetic disk storage unit and writing data to the magnetic disk storage unit, comprising the steps of:

receiving a data signal from a control unit to a disk drive;

setting a final location on a magnetic surface of a platter in said disk drive according to said data signal, said platter rotating around an axis in said disk drive;

setting a plurality of intermediate locations on said magnetic surface;

transporting a head unit of said disk drive to a plurality of positions seriatim, said plurality of positions corresponding to said plurality of intermediate locations and said final location, said transporting step including an acceleration motion, a uniform motion, and a deceleration motion of said head unit, collecting contaminants from said magnetic surface with said head unit and then removing the contaminants from said head unit; and recording data corresponding to said data signal at said final location with said head unit.

22. The method of claim 21, further comprising an adhesive panel of said disk drive, wherein the contaminants removed from said head unit do not return to said magnetic surface, the contaminants permanently adhere to said adhesive panel.

23. The method of claim 21, further comprising a low pressure region of said disk drive, wherein the contaminants removed from said head unit do not return to said magnetic surface, the contaminants travel to said low pressure region, said low pressure region being separate from regions adjacent to said magnetic surface and said head unit, said low pressure region having a lower pressure than regions adjacent to said magnetic surface and said head unit.

24. The method of claim 21, further comprising a filter unit of said disk drive, wherein the contaminants removed from said head unit do not return to said magnetic surface, said filter unit prevents the contaminants from returning to said magnetic surface.

25. The method of claim 21, said acceleration motion, uniform motion, and deceleration motion including a shaking of said head unit, said shaking removing the contaminants from said head unit.

26. The method of claim 21, whereby gas traveling across said head unit removes contaminants from said head unit.

* * * * *